United States Patent Office 3,277,190
Patented Oct. 4, 1966

3,277,190
COAGULATION OF CARBONACEOUS IMPURITIES BY HYDROGEN SULFIDE IN SULFURIC ACID RECOVERY
Kenneth B. Cofer, Pasadena, and Samuel F. Culberson, Houston, Tex., assignors to Shell Oil Company, New York, N.Y., a corporation of Delaware
No Drawing. Filed Dec. 16, 1963, Ser. No. 330,579
4 Claims. (Cl. 260—639)

This invention relates to an improved method for the recovery of sulfuric acid from contaminated solutions thereof. More particularly, it relates to an improved process for the removal of solid carbonaceous material from sulfuric acid solutions, and particularly such spent acids as are produced in the manufacture of alcohols from olefins.

The utilization of sulfuric acid in industrial operations is well established. The utility of sulfuric acid as a dehydrating agent, as an acidic catalyst for alkylation and like processes, as an absorbent for olefins and in other applications has led to the usage of large quantities of this material. Such usage, however, has an attendant disadvantage, in that sulfuric acid, particularly concentrated solutions thereof, also exhibits the property of serving as an oxidizing agent and in many industrial operations, the sulfuric acid solutions rapidly become contaminated with carbon and like solid carbonaceous material which are produced as by-products of the desired operation. Elimination of such carbonaceous material is required to prevent processing difficulties and to allow further utilization of the spent acid solution. The carbon removal is customarily effected by processes of filtration, which processes are difficult because of the colloidal nature of the carbonaceous material. It would be of considerable advantage to provide a method whereby removal of carbonaceous material from sulfuric acid solutions is facilitated.

It is the object of this invention to provide an improved process for the recovery of spent sulfuric acid solutions. More particularly, it is an object to provide an improved process for the removal of carbon and like insoluble carbonaceous material from sulfuric acid solutions.

It has now been found that these objects are accomplished by the process of adding a small amount of hydrogen sulfide to solutions of sulfuric acid containing suspended carbonaceous material as contaminants. The addition of hydrogen sulfide serves to effect extensive coagulation of the carbon particles which are subsequently removed from the sulfuric acid solution with greater facility.

The sulfuric acid solutions that are suitably employed in the process of the invention are of variable concentration and have variable contents of carbonaceous material, which term, as employed herein, is used to indicate carbon, tars, gums and like materials such as are formed in many industrial operations utilizing sulfuric acid, particularly in the absorption of olefins by sulfuric acid to form alcohol precursors. Best results are obtained in the process of the invention when the concentration of the sulfuric acid solution is from about 20% to about 95% by weight hydrogen sulfate, although solutions having concentrations from about 30% to about 80% by weight hydrogen sulfate are preferred and optimum utilization of the process of the invention is obtained when the acid solution contains from about 40% to about 60% by weight hydrogen sulfate.

The content of the carbonaceous material in the spent sulfuric acid solution will to a great extent be determined by the source of the sulfuric acid solution and the conditions under which it has been employed. Sulfuric acid solutions containing from about 1 to about 100 grams of carbonaceous materials per kilogram of solution are suitably employed in the process of the invention, although the utilization of solutions containing from about 2 to about 20 grams of carbonaceous material per kilogram of solution is preferred.

The invention is particularly useful in the treatment of spent sulfuric acid solutions which arise from absorption of olefins, especially lower olefins, by sulfuric acid followed by hydrolysis of the alkyl sulfates in the production of lower alcohols such as isopropyl alcohol and sec-butyl alcohol. In this process, an olefin-containing hydrocarbon stream is usually contacted with a suitable acid stream, e.g., 65% to 85% by weight acid, to absorb the olefin and the resulting fat acid is then diluted with water to produce the alcohol. Such used acid solutions typically contain from about 45% to about 55% by weight sulfuric acid and from about 2 to about 20 grams of carbonaceous material per kilogram of acid, and frequently from about 4 to about 10 grams of carbonaceous material per kilogram of acid.

The process of the invention comprises the addition of hydrogen sulfide to the sulfuric acid solution to coagulate the suspended carbonaceous material. The hydrogen sulfide is employed in any convenient form, although particular advantage is taken of gaseous hydrogen sulfide. The hydrogen sulfide is added to the sulfuric acid solution in amounts from about 10 p.p.m. to about 1000 p.p.m. Preferred, however, are added amounts of hydrogen sulfide from about 100 p.p.m. to about 500 p.p.m., and in the most preferred embodiment of the invention, i.e., treatment of spent acid solutions resulting from olefin absorption, additions of hydrogen sulfide from 100 p.p.m. to 300 p.p.pm. are satisfactory.

Subsequent to the addition of the hydrogen sulfide, the coagulated particles of carbonaceous matter are removed by conventional methods. Such methods include filtration, as by passing the acid through a bed of coarse sand or similar material, or by decantation following one or more settling periods, typically from about 4 to about 6 hours in one stage and up to 48 hours in a second stage.

In the process of the invention, certain amounts of sulfur and/or metallic sulfides are customarily precipitated. The amount of such materials is negligible, and their formation does not interfere with the settling or filtration of the coagulated carbonaceous material.

The process of the invention results in a concentration of the carbonaceous material; typically a concentration of from about 10- to about 30-fold is obtained in the first stage, and in the second stage practically complete concentration. The acid solution as obtained from the filtering or settling system is suitable for utilization in subsequent industrial operations, or alternatively may be further purified by methods previously known.

To further illustrate the process of the invention, the following example is provided. It should be understood that this example should not be regarded as a limitation, as the teachings thereof may be varied as will be understood by one skilled in this art.

Example

In a facility consisting of a hydrogen sulfide-sulfuric acid pipeline mixer and a two-stage settling system, approximately 60 gallons per minute (g.p.m.) of 48–52% by weight sulfuric acid solution resulting from an alcohol stripping operation containing from about 2 to 20 g. carbon/kg. acid was mixed with approximately 200 p.p.m. hydrogen sulfied and fed continuously to an 18,000-gallon settling vessel. A continuous underflow of 3 to 4 g.p.m. was withdrawn from this vessel and fed to a second-stage settler which was also an 18,000-gallon vessel. The overflow streams from both vessels were combined and fed to a spent acid concentration system and thence back to the olefin stage of an alcohol producing unit. The underflow stream from the second-stage settler, which consisted of a concentrated carbon slurry, was blended with a 78% reconcentrated acid purge stream from the spent acid concentration system and was used in the alkylation of olefins with isoparaffins to form alkylate gasolines.

Results indicated that a 10- to 15-fold concentration of carbon was achieved in the first-stage settler, and an additional 20- to 30-fold concentration was realized in the second-stage settler.

We claim as our invention:

1. The process for the recovery of sulfuric acid from solutions thereof containing suspended carbonaceous material by adding from about 10 p.p.m. to about 1000 p.p.m. hydrogen sulfide to a solution containing from about 20% to about 95% by weight hydrogen sulfate and containing from about 1 to about 100 g. of carbonaceous material per kilogram of solution, and removing the coagulated carbonaceous material therefrom.

2. The process for the recovery of sulfuric acid from solutions thereof containing suspended carbonaceous material by adding from about 100 p.p.m. to about 500 p.p.m. hydrogen sulfied to a solution containing from about 30% to about 80% by weight hydrogen sulfate and containing from about 2 to about 20 g. of carbonaceous material per kilogram of solution, and removing the coagulated carbonaceous material therefrom.

3. The process for the recovery of sulfuric acid from solutions thereof containing suspended carbonaceous material by adding from about 100 p.p.m. to about 300 p.p.m. hydrogen sulfide to a solution containing from about 45% to about 55% by weight hydrogen sulfate and from about 4 to about 10 grams of carbonaceous material per kilogram of solution, and removing the coagulated carbonaceous material therefrom.

4. In the process for the production of lower alcohols by contacting lower olefins with sulfuric acid solution, hydrolyzing the alkyl sulfates thereby produced, separating the alcohols from the used sulfuric acid containing suspended carbonaceous material, reconcentrating the used sulfuric acid solution and returning the concentrated acid to the olefin contacting zone, the improvement which comprises adding from about 10 p.p.m. to about 1000 p.p.m. hydrogen sulfide to said used acid and removing the coagulated carbonaceous material therefrom.

No references cited.

LEON ZITVER, *Primary Examiner.*

J. E. EVANS, *Assistant Examiner.*